US007991549B2

(12) United States Patent
Kimita et al.

(10) Patent No.: US 7,991,549 B2
(45) Date of Patent: Aug. 2, 2011

(54) TRAFFIC INFORMATION SYSTEM BASED ON TRAVEL HISTORY

(75) Inventors: Kazuya Kimita, Sagamihara (JP); Takayoshi Yokota, Hitachiota (JP); Koichiro Tanikoshi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 747 days.

(21) Appl. No.: 12/019,151

(22) Filed: Jan. 24, 2008

(65) Prior Publication Data

US 2008/0243377 A1 Oct. 2, 2008

(30) Foreign Application Priority Data

Mar. 27, 2007 (JP) ................................ 2007-080458

(51) Int. Cl.

| | |
|---|---|
| ***G01C 21/30*** | (2006.01) |
| ***G01C 21/32*** | (2006.01) |
| ***G08G 1/00*** | (2006.01) |
| ***G01C 21/00*** | (2006.01) |

(52) U.S. Cl. ........ 701/210; 701/117; 701/208; 701/209; 701/213

(58) Field of Classification Search .................. 340/988, 340/955.1–995.28

See application file for complete search history.

(56) References Cited

U.S. PATENT DOCUMENTS

| | | | | |
|---|---|---|---|---|
| 5,182,555 | A | 1/1993 | Sumner | |
| 6,882,930 | B2 * | 4/2005 | Trayford et al. | 701/117 |
| 7,480,565 | B2 * | 1/2009 | Ikeuchi et al. | 701/208 |
| 7,525,451 | B2 * | 4/2009 | Yoshikawa et al. | 340/995.13 |
| 7,831,384 | B2 * | 11/2010 | Bill | 701/209 |

FOREIGN PATENT DOCUMENTS

| | | | |
|---|---|---|---|
| EP | 1 258 839 | A2 | 11/2002 |
| JP | 2002-107169 | A | 4/2002 |
| JP | 2005-149465 | A | 6/2005 |
| JP | 2005-195358 | A | 7/2005 |
| JP | 2006-177792 | A | 7/2006 |
| JP | 2006-293876 | A | 10/2006 |

OTHER PUBLICATIONS

European Search Report dated Jul. 4, 2008 (Three (3) pages).

* cited by examiner

*Primary Examiner* — Khoi Tran
*Assistant Examiner* — Bao Long Nguyen
(74) *Attorney, Agent, or Firm* — Crowell & Moring LLP

(57) ABSTRACT

A traffic information system including a travel history database retaining the data on the travel history of vehicle measured at a constant temporal or running interval; a link cost weighting pattern database for storing patterns for weighting the link costs of road links, used in the determination of the travel paths of vehicles; a vehicle ID/link cost weighting pattern set database retaining the data representing the matching of the vehicle IDs with their associated link cost weighting patterns used to determine the travel paths of the vehicles; a link cost weighting pattern selection unit selecting the patterns for weighting the link costs used to determine the travel paths of the vehicles on the basis of the vehicle IDs; and a vehicle ID/link cost weighting pattern matching unit recording the data representing the matching of the vehicle IDs with their associated link cost weighting patterns.

2 Claims, 5 Drawing Sheets

102

| VEHICLE ID | LATITUDE | LONGITUDE | DATE | TIME | ... |
|---|---|---|---|---|---|
| VEHICLE A | LATITUDE A1 | LONGITUDE A1 | DATE A1 | TIME A1 | ... |
| VEHICLE A | LATITUDE A2 | LONGITUDE A2 | DATE A2 | TIME A2 | ... |
| VEHICLE A | LATITUDE A3 | LONGITUDE A3 | DATE A3 | TIME A3 | ... |
| VEHICLE B | LATITUDE B1 | LONGITUDE B1 | DATE B1 | TIME B1 | ... |
| ⋮ | ⋮ | ⋮ | ⋮ | ⋮ | ⋮ |

FIG.3

| LINK COST WEIGHTING PATTERN ID | EXPRESSWAY | REGULAR ROAD | NARROW STREET |
|---|---|---|---|
| PATTERN 1 (AVERAGE) | 1.0 | 1.0 | 1.0 |
| PATTERN 2 (NOVICE) | 1.1 | 0.7 | 1.2 |
| PATTERN 3 (BYPATH PREFERRED) | 1.1 | 1.1 | 0.8 |
| PATTERN 4 (EXPRESSWAY PREFERRED) | 0.8 | 1.1 | 1.1 |
| ⋮ | ⋮ | ⋮ | ⋮ |

111

※ GREATER NUMBERS PRODUCE HIGHER LINK COSTS AND ROAD LINKS HAVING HIGHER LINK COSTS ARE LESS FREQUENTLY SELECTED

FIG.4

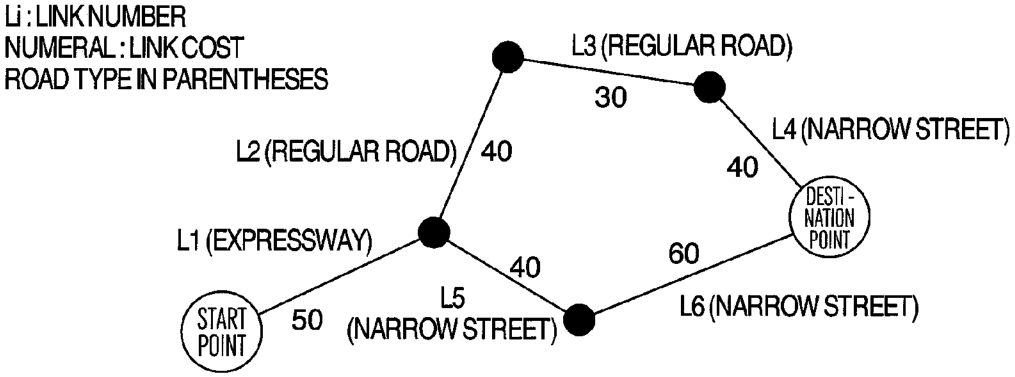

FIG.5

| VEHICLE ID | LINK COST WEIGHTING PATTERN ID |
|---|---|
| VEHICLE A | PATTERN 1 (AVERAGE) |
| VEHICLE B | PATTERN 2 (EXPRESSWAY PREFERRED) |
| VEHICLE C | PATTERN 3 (NOVICE) |
| VEHICLE D | PATTERN 4 (BYPATH PREFERRED) |
| ⋮ | ⋮ |

112

TRAFFIC INFORMATION SYSTEM BASED ON TRAVEL HISTORY

BACKGROUND OF THE INVENTION

This invention relates to a traffic information system which generates traffic data by using the data on the travel histories of vehicles and distributes the generated traffic data through radio communication.

There have recently been developed floating car based traffic information systems which generate traffic data by using the data on the travel histories of vehicles. When such a system generates the traffic data on the roads which a vehicle traveled and distributes the generated data by radio communication, it is possible to provide traffic data of high instant availability by increasing the process speed of the system, and thereby increasing the renewal frequency of the traffic data. The user of an in-vehicle navigation system that utilizes such traffic data through radio reception, can foresee the traffic condition such as road congestion and choose one of paths for circumventing such traffic jam.

Since this traffic information system generates such traffic data depending on the speed at which a vehicle is supposed to have actually traveled a certain path, the traffic information system must use such data on the travel history of the vehicle as to enable the path that the vehicle has traveled along to be accurately determined in order to provide the traffic data with high accuracy.

To realize this in the simplest way is to use the detailed travel history data obtained by sampling and recording the travel history of vehicle at short temporal or spatial intervals. However, such detailed travel history data entail a huge data size which leads to a heavy process load and therefore prolonged process time. Further, when such detailed travel history data are used in communications through networks, a great communication cost will be incurred. Therefore, it is not preferable to use such detailed travel history data as it is for the floating car based traffic information system which must generate traffic data of high accuracy and high instant availability.

In order to improve the instant availability of the traffic data, therefore, the requirement must be satisfied that the amount of data on the travel history of vehicle as well as the data process time of the system must be reduced. According to JP-A-2005-149465 which discloses the system that has solved the problem of data size, the technique of data compression is used to reduce the size of data on the travel history and therefore to reduce the communication cost. This system, however, incurs a new process load such as data compression and decompression so that process time will be increased.

There is known a method of using the travel history data obtained by recording the travel history of vehicle at temporal or spatial intervals longer than those at which the above mentioned detailed travel history data are obtained by recording the travel history of vehicle. With this method, since the interval of collecting data becomes longer, the size of the data on travel history is reduced so that the process load is reduced, and the process speed is increased. As a result, however, there is possibility that the accuracy with which the travel path is determined depending on the travel history data is adversely affected. Such accuracy can be improved by utilizing the driver's disposition in choosing travel paths extracted from the way he chose his travel paths in the past, as compared with the case where no such driver's psychology is considered.

Examples of the in-vehicle navigation system which offers to the driver the travel paths selected in accordance with his disposition in choosing travel paths, include the conventional arts disclosed in JP-A-2002-107169, JP-A-2005-195358 and JP-A-2006-177792. However, since those systems obtain travel history data by recording the travel history of vehicle at relatively short temporal or spatial intervals, the resulted travel history data becomes immense in size and therefore cannot be used for the floating car based traffic information system without somehow reducing the data size.

SUMMARY OF THE INVENTION

The above mentioned conventional arts have the problem that the reduction of the size of the data on the travel history of vehicle and the reduction of the process load leading to the increase in the process speed cannot be attained at the same time.

The object of this invention which has been made to overcome the above mentioned problem, is to provide a method capable of determining more accurate travel paths than those determined according to the conventional arts, on the basis of the travel history data obtained by recording the travel history of vehicle at relatively long temporal or spatial intervals.

A traffic information system according to this invention which has been made to attain the above mentioned object, comprises a travel history database for retaining travel history data measured at least at regular temporal or spatial intervals; a link cost weighting pattern database for storing weighting patterns for road sections (hereafter referred to as road links) used in the process of determining travel paths; a vehicle ID (identification)/link cost weighting pattern set database for retaining the data representing the matched relationships between vehicles and the corresponding patterns for weighting link costs; a map matching unit for specifying the road link which a vehicle traveled along, by using the travel history data accumulated in the travel history database; a travel path determination unit for determining the travel path of the vehicle depending on the specified road link; a link cost weighting pattern selection unit for selecting the patterns for weighting the link costs used in the process of determining travel paths in accordance with vehicle IDs; and a vehicle ID/link cost weighting pattern matching unit for storing in the vehicle ID/link cost weighting pattern set database the data representing the set of the vehicle IDs and their previously matched patterns for weighting the link costs used to determine the travel paths depending on the travel histories of vehicles.

In the traffic information system described above, the vehicle ID/link cost weighting pattern matching unit comprises a detailed travel history database for retaining the data on the detailed travel history of vehicle measured at temporal or spatial intervals shorter than those at which the travel history of vehicle are recorded, in order to specify the actual travel path of a vehicle; a travel history data extraction unit for extracting the vehicle travel history data measured during the time period for which both the travel history and the detailed travel history are simultaneously recorded, from both the travel history database and the detailed travel history database, respectively; a map matching unit for specifying the road link which a vehicle travels along, depending on the extracted vehicle travel history data; an entire pattern travel path determination unit for determining a travel path depending on the specified road links by using all the patterns for weighting link costs, stored in the link cost weighting pattern database; a detailed map matching unit for specifying the road link which a vehicle travels along, by using the detailed travel history data extracted from the detailed travel history database; a detailed travel path determination unit for determining the travel path of the vehicle depending on the road links specified by the detailed map matching unit; and a travel path comparison unit for comparing the travel paths determined by the entire pattern travel path determination unit with the travel path determined by the detailed travel path determination unit, for matching the link cost weighting pattern used to determine the travel path of best coincidence with the ID of the vehicle to be subjected to the intended process, and for storing the matched information in the vehicle ID/link cost weighting pattern set database.

The vehicle ID/link cost weighting pattern set database according to this invention has a function of storing the information of matching the data such as dates and areas with the corresponding link cost weighting patterns, in addition to the information of matching the vehicle IDs with the corresponding link cost weighting patterns. Accordingly, the link cost weighting pattern selection unit has a function of selecting link cost weighting patterns combined with dates and areas as well as with vehicle IDs.

According to a floating car based traffic information system embodying this invention, communication cost can be reduced by reducing the size of the data on the travel history of vehicle used to generate traffic data, link cost weighting patterns for accurately determining the travel paths of vehicles can be previously established, and the travel paths of vehicles can be accurately determined by using the established link cost weighting patterns. As a result, highly accurate traffic data can be generated and distributed.

Other objects, features and advantages of the invention will become apparent from the following description of the embodiments of the invention taken in conjunction with the accompanying drawings.

BRIEF DESCRIPTION OF THE DRAWINGS

FIG. 3 is a table showing the structure of link cost weighting patterns used in the traffic information system shown in FIG. 1;

FIG. 4 is a diagram for illustrating the calculation of the total of the weighted link costs;

FIG. 5 shows the matching between the vehicle IDs and the corresponding link cost weighting patterns;

DESCRIPTION OF THE EMBODIMENTS

Figures 1, 2:
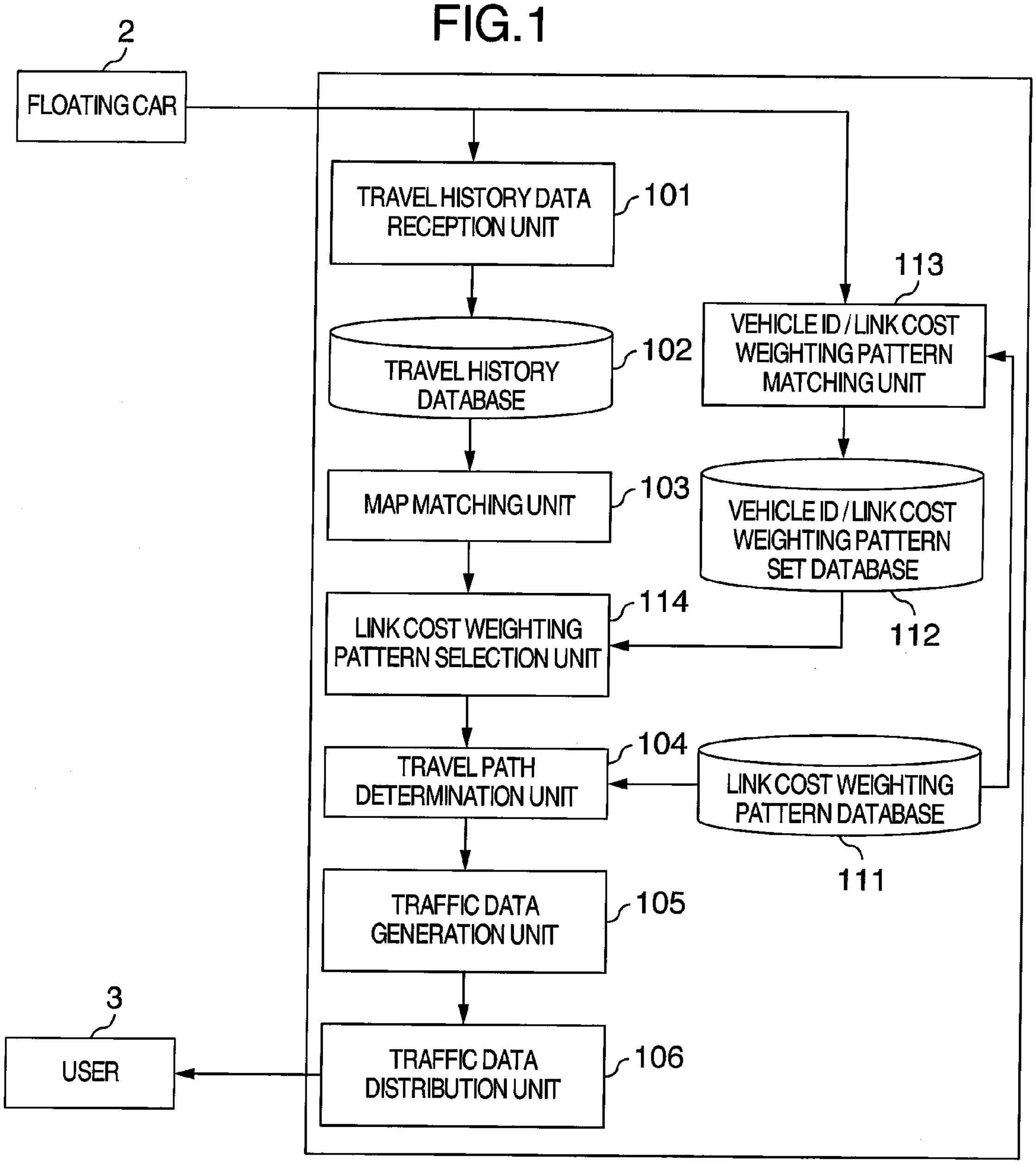
FIG. 1 shows in block diagram a traffic information system as an embodiment of this invention.
FIG. 2 shows the structure of data on the travel histories of vehicles for use in the real-time process.

In general, the travel paths of vehicles driven at will by different drivers may vary depending on their fancies or desires, and therefore they will take different routes in traveling from a start point to a destination point. FIG. 1 shows an embodiment of a traffic information system which reflects such a situation as described just above, and which can generate highly accurate traffic data by previously allocating link cost weighting patterns used for determining the travel paths of vehicles to the vehicles respectively and by determining the travel paths depending on the link cost weighting patterns.

Embodiment 1

The traffic information system shown in FIG. 1 includes a travel history data reception unit 101 for receiving, through, for example, radio communication from a floating car 2, the travel history data measured at long temporal intervals or at predetermined spatial intervals during the travel of vehicle, for the real-time processing to generate traffic data to be distributed; a travel history database 102 for retaining the travel history data received by the travel history data reception unit 101; a map matching unit 103 for specifying the road links which a vehicles traveled along at the time points when the positions of the vehicle was measured, by using the travel history data retained in the travel history database 102; a travel path determination unit 104 for determining the travel path of the vehicle depending on the result of processing executed by the map matching unit 103 by using link cost weighting patterns; a traffic data generation unit 105 for generating traffic data depending on the result of processing executed by the travel path determination unit 104; and a traffic data distributing unit 106 for distributing the traffic data generated by the traffic data generation unit 105 to users 3 through, for example, radio communication.

Also, the traffic information system includes a link cost weighting pattern database 111 for storing one or more patterns for weighting link costs used in the travel path determination unit 104; a vehicle ID/link cost weighting pattern set database 112 for retaining the sets of data each of which matches vehicle IDs with the corresponding patterns for weighting the link costs stored in the link cost weighting pattern database 111, and gives the reconstruction of the best travel path for vehicle; a vehicle ID/link cost weighting pattern matching unit 113 for previously storing the data representing the sets of the vehicle IDs and their previously matched link cost weighting patterns used to determine the travel paths of the vehicles in the vehicle ID/link cost weighting pattern set database 112, each data set giving the most accurate determination of the travel path for each vehicle; a link cost weighting pattern selection unit 114 for selecting patterns for weighting link costs used in the travel path determination unit 104, through the reference to the vehicle ID/link cost weighting pattern set database 112 by using the data on the vehicle IDs included in the result of map matching process.

FIG. 2 shows the structure of data, stored in the travel history database 102, on the travel histories of vehicles for use in the real-time process. Each piece of the travel history data for real-time processing includes at least a vehicle ID capable of uniquely identifying a vehicle, the latitude and longitude of the position of the vehicle measured by, for example, a GPS (global positioning system), and the date and hour of such measurements. The data enable a specific road link to be determined which a vehicle of interest was traveling along at the hour on the day when the position of the vehicle was measured. Further, this data can finally lead to the determination of an entire travel path for the vehicle through the successive determinations of the sectional travel paths depending on the time-sequence of the travel histories of the vehicle.

In general, the data on the travel history of a vehicle, i.e. travel history data, is taken at temporally and spatially different points on a continuous road; the road link is defined as a section of the road between two successive points on the road; the link cost is defined as, for example, the length of each road link or the time (hereafter referred to as link travel time) required for a vehicle to travel through the road link; and the travel path for the vehicle is determined in such a manner that the total of the link costs for the respective road links connecting the predetermined start and destination points on the road is minimized.

However, the actual choice of travel paths taken in driving a vehicle depends on the driving skills as well as the personalities, of drivers. For example, a novice driver will prefer a travel path consisting mainly of regular roads longer in driving time but wider and therefore easier to drive through, to a travel path consisting mainly of bypaths and narrow streets both of which contribute to the minimization of calculated cost. Namely, it may be considered that the driver chooses his travel path depending on not only the mere total of the link costs but also the resultant cost calculated by weighting the link costs depending on the types (expressway, regular road, etc.) of road links.

According to this invention, such plural link cost weighting patterns are prepared and stored in the link cost weighting pattern database 111, and the travel path of a vehicle is determined by the travel path determination unit 104 through the use of a link cost weighting pattern suitable for the vehicle. FIG. 3 is a table showing the correspondence between link cost weighting pattern IDs and the associated link cost weighting values, stored in the link cost weighting pattern database 111. The link costs are multiplied by their associated weighting values when the weighted total of the road links along the travel path is calculated depending on the types of the road links. It is noted here that the greater is the weighting value, the smaller is the probability that a driver chooses the associated road link.

In the example shown in FIG. 3, as compared with the pattern 1 supposed to correspond to an average driver who drives along all types of roads evenly without any particular preference, the pattern 2 supposed to correspond to a novice driver who tends to drive along regular roads which are wide and easy to drive through, rather than narrow streets which are small in width and necessitate the more frequent manipulations of steering wheel, has a smaller weighting value for a regular road than the corresponding weighting value in the pattern 1 and also has a larger weighting value for a narrow street than the corresponding weighting value in the pattern 1. Further, since it is hard to consider that a novice driver prefers to frequently drive through expressways where unusual vehicle manipulations are necessitated at toll gates or in time of drive lane changes, the weighting value for an expressway in the pattern 2 is set larger than the corresponding weighting value in the pattern 1 for average drivers.

In the pattern 3 which is supposed to correspond to a driver whose preference is to prioritize the choice of narrow streets so as to reach the destination as soon as possible, the weighting value for a narrow street is set smaller than the corresponding weighting value in the average pattern 1 under the assumption that it is easy for this type of driver to travel along narrow streets which only a small number of vehicles are supposed to traffic. On the other hand, the weighting values for other types of roads in the pattern 3 are set larger than the corresponding weighting values in the average pattern 1.

Finally, in the pattern 4 supposed to correspond to a driver who is willing to pay a toll to travel safely and reach the destination as soon as possible and therefore chooses expressways, the weighting value for expressway is set smaller than the corresponding weighting value in the average pattern 1, and the weighting values for other types of roads in the pattern 4 are set larger than the corresponding weighting values in the average pattern 1.

A travel path for a vehicle is determined by calculating the minimum value of the weighted total of the link costs of the road links constituting a path from the start point to the destination point according to the above described patterns of weighting the link costs. Namely, the travel path for a vehicle is determined as the travel path that the vehicle chooses at the greatest probability. Now, let n road links constituting the path that a vehicle traveled along be represented as Li (i=1, 2, . . . , n), wherein "n" is a positive integer number. Then, by using the Dijkstra's algorithm, for example, the travel path for the vehicle is determined as the path for which the total of the weighted link costs, represented by $\Sigma(w(Li)\times ci)$, is minimized, where w(Li) is the weighting value for the link cost for a road link Li selected depending on the type of road and ci is the link cost of the link Li.

For example, in the case of a road link combination shown in FIG. 4, the weighting values for the pattern 1 in FIG. 3 are used for an average drover to calculate the weighted total of the link costs. If the average driver travels along the route from start to destination, following road links L1, L2, L3 and L4, the weighted total of the link costs is calculated such that $1.0\times50+1.0\times40+1.0\times30+1.0\times40=160$. For the route following road links L1, L5 and L6, the weighted total is $1.0\times50+1.0\times40+1.0\times60=150$. Hence, the probability of choice of travel path is greater for the route made up of the road links L1, L5 and L6.

For a novice driver, on the other hand, calculation is made by using the weighting values in the pattern 2 in FIG. 3. In this case, the weighted total of the link costs for the route consisting of the road links L1, L2, L3 and L4 is $1.1\times50+0.7\times40+0.7\times30+1.2\times40=152$. For the route of the road links L1, L5 and L6, the weighted total is $1.1\times50+1.2\times40+1.2\times60=175$. Therefore, the probability of choosing the travel path made up of the road links L1, L2, L3 and L4 is greater for the novice driver than for the average driver. In this way, the preference of the travel path selection can be reflected on the weighted total of the link costs.

As shown in FIG. 3, the values for weighting the link costs, i.e. link cost weighting values or simply weighting values, are preset depending on the types of roads such as expressways, regular roads and narrow streets. But the weighting values may be preset according to other ways of road classification such as toll roads, toll-free roads, national roads or local roads. Further, the weighting values may be independently allocated to individual road links.

It is noted that the link cost weighting patterns must be clearly discriminated from the link cost weighting values or weighting values throughout this specification. A link cost weighting pattern is a way of allocating weighting values to different types of roads. Since the link cost weighting patterns are considered to be allocated to respective drivers or vehicles according to this invention, the link cost weighting patterns are previously matched with the vehicle IDs for identifying respective vehicles, and the matched information is stored in the vehicle ID/link cost weighting pattern set database 112. FIG. 5 shows the data structure of the correspondence of vehicle IDs to the matched link cost weighting patterns, retained in the vehicle ID/link cost weighting pattern set database 112 as described above. Although the link cost weighting patterns are matched with the vehicle IDs in FIG. 5, the vehicle IDs may be matched with some appropriate combinations of the link cost weighting values as shown in FIG. 3.

In the example shown in FIG. 5, the link cost weighting patterns are matched with the respective vehicle IDs. However, since a driver may change his travel path depending on the hours, dates or areas of drive, the link cost weighting patterns may be matched with not only the vehicle IDs but also the combination of the attributes to the date (weekdays, weekends, mornings, evenings, etc.) and the locality data, and the matched data may be retained in the vehicle ID/link cost weighting pattern set database 112.

As described above, the travel path of a vehicle of interest can be accurately determined by previously retaining the link cost weighting patterns in the link cost weighting pattern database 111; by previously retaining the correspondence of the link cost weighting patterns to the vehicle IDs in the vehicle ID/link cost weighting pattern set database 112; and by selecting an appropriate link cost weighting pattern used in the travel path determining unit 104, depending on the vehicle ID of the vehicle whose travel path is to be determined, by means of the link cost weighting pattern selection unit 114. The determined travel path is denoted by a series of nodes representing the road links constituting the determined travel path or the coordinates of the nodes. Each node is to be discriminated from another with its unique node ID.

In order to effectuate travel path determination by using link cost weighting patterns, it is necessary to previously retain the link cost weighting patters matched with the associated vehicle IDs and used in the procedure of determining travel paths, in the vehicle ID/link cost weighting pattern set database 112. There are various ways of matching the vehicle IDs with the link cost weighting patterns. For example, such matching may be performed as depending on the opinions of drivers. This way of matching, however, is not proper since this may create a possibility that the preference in the choice of an actual travel path is not reflected due to a driver's preoccupation.

Figure 6:
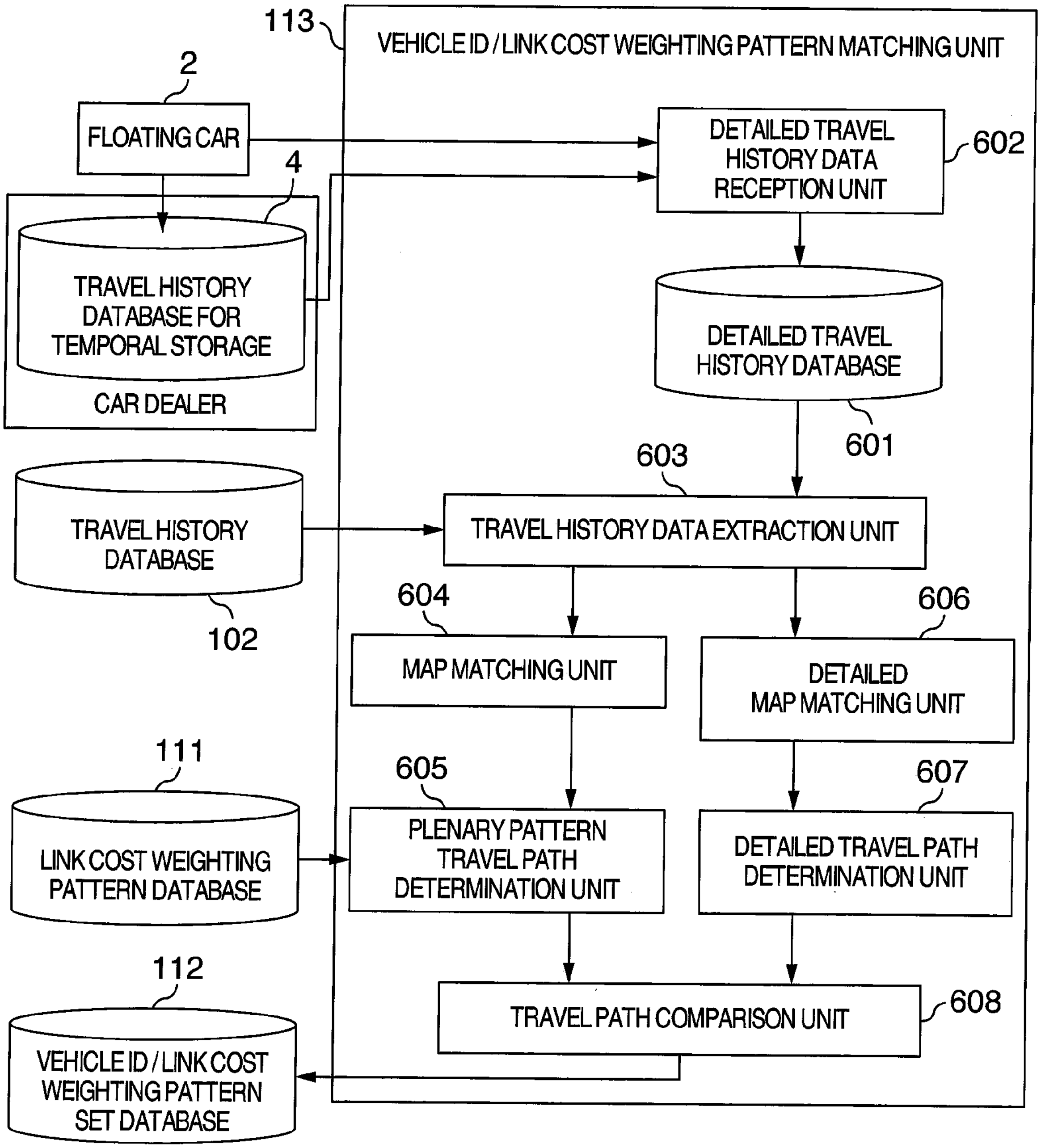
FIG. 6 shows in block diagram the detailed structure of the vehicle ID/link cost weighting pattern matching unit used in the traffic information system shown in FIG. 1.

Accordingly, besides the travel history data used in the real-time processing to generate successive traffic data to be distributed by radio communication, detailed travel history data are collected at time intervals or spatial intervals of vehicle travel shorter than those at which the travel history data used for the real-time processing are measured so as to accurately record the path that a vehicle actually travels along; and each link cost weighting pattern is specified for use in the later procedure of determining vehicle paths, depending on the comparison between the travel path determined by using the thus collected detailed travel history data and the travel path determined by using the link cost weighting patterns stored in the link cost weighting pattern database 111. FIG. 6 shows in block diagram the structure of an example of the vehicle ID/link cost weighting pattern matching unit 113 used in such a procedure as described above.

In FIG. 6, the vehicle ID/link cost weighting pattern matching unit 113 comprises a detailed travel history database 601 for retaining the data on the detailed travel history of vehicle collected at temporal or spatial intervals shorter than those at which the travel history data for real-time processing are recorded, in order to accurately determine the travel path of a vehicle; a detailed travel history data input unit 602 for receiving the detailed travel history data directly from the floating car 2 or from the temporary storage travel history database 4 of, for example, a car dealer which receives the detailed travel history data from the floating car 2 and temporarily stores them, and for loading the received detailed travel history data into the detailed travel history database 601; a travel history data extraction unit 603 for extracting the travel history data for real-time processing and the detailed travel history data from the travel history database 102 and the detailed travel history database 601, respectively, during the time period for which both the travel history for real-time processing and the detailed travel history are simultaneously recorded; a map matching unit 604 for specifying the road link which a vehicle traveled along, by using the travel history data for real-time processing extracted from the travel history database 102 by the travel history data extraction unit 603; an entire pattern travel path determination unit 605 for determining the travel path following the road links specified by the map matching unit 604, by using all the link cost weighting patterns stored in the link cost weighting pattern database 111; a detailed map matching unit 606 for specifying the road link which a vehicle traveled along at the time of vehicle position measurement, by using the detailed travel history data extracted from the detailed travel history database 601 by the travel history data extraction unit 603; a detailed travel path determination unit 607 for determining the actual travel path of vehicle depending on the road links specified by the detailed map matching unit 606; and a travel path comparison unit 608 for comparing the travel paths determined by the entire pattern travel path determination unit 605 with the travel paths determined by the detailed travel path determination unit 607 to calculate a travel path coincidence factor, specifying the link cost weighting pattern corresponding to the highest travel path coincidence factor, that is, the link cost weighting pattern leading to the most accurate determination of the travel path of a vehicle, matching the thus specified link cost weighting pattern with the ID of the vehicle, and storing the matched information in the vehicle ID/link cost weighting pattern set database 112.

In the above described constitution, the map matching unit 604 and the detailed map matching unit 606 may be the same as the map matching unit 103, and the detailed travel path determination unit 607 may be of the same structure as the travel path determination unit 104. Further, the travel path determination procedure performed in the entire pattern travel path determination unit 605 may be the same as that performed in the travel path determination unit 104.

Figure 7:
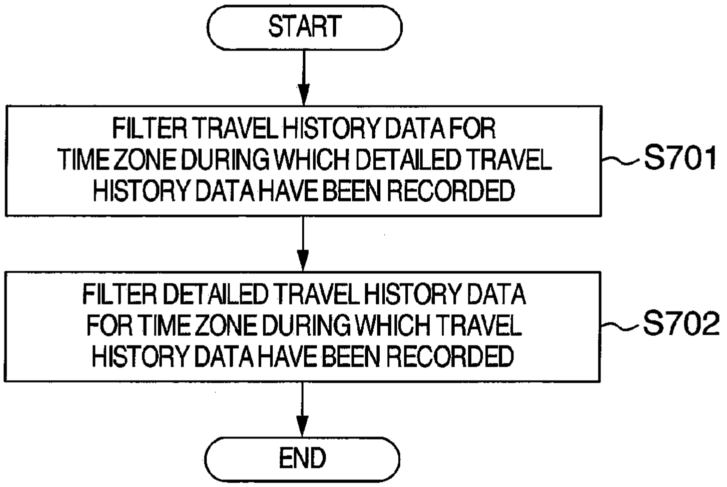
FIG. 7 is a flow chart for the procedure executed by the travel history data extraction unit used in the vehicle ID/link cost weighting pattern matching unit shown in FIG. 6.

FIG. 7 is a flow chart for the procedure for extracting those travel history data recorded for a specific vehicle which are simultaneously recorded in both the travel history database 102 and the detailed travel history database 601, from the travel history database 102 and the detailed travel history database 601 by the travel history data extraction unit 603.

With respect to a vehicle of interest, the travel history data retained in the travel history database 102 are subjected to filtering for the time zone during which the detailed travel history data are recorded in the detailed travel history database 601, and only the travel history data during the time zone are extracted (Step 701). Accordingly, the travel history data for the longest of the time zones during which the detailed travel history data are recorded, can be obtained. Then, the detailed travel history data are subjected to filtering for the time zone during which the extracted travel history data were recorded so that the detailed travel history data collected during the same time zone are extracted (Step 702). Since the detailed travel history data are recorded at shorter temporal or spatial intervals as described above, the detailed travel history data can be extracted, as a result of this procedure, for the time zone approximately equal to the time zone for which the travel history data are extracted.

The time zone for filtering may cover not only the entire periods of collecting the data to be recorded in either of the databases 102 and 602, but also a specific duration, for example, within a month or so.

Figure 8:
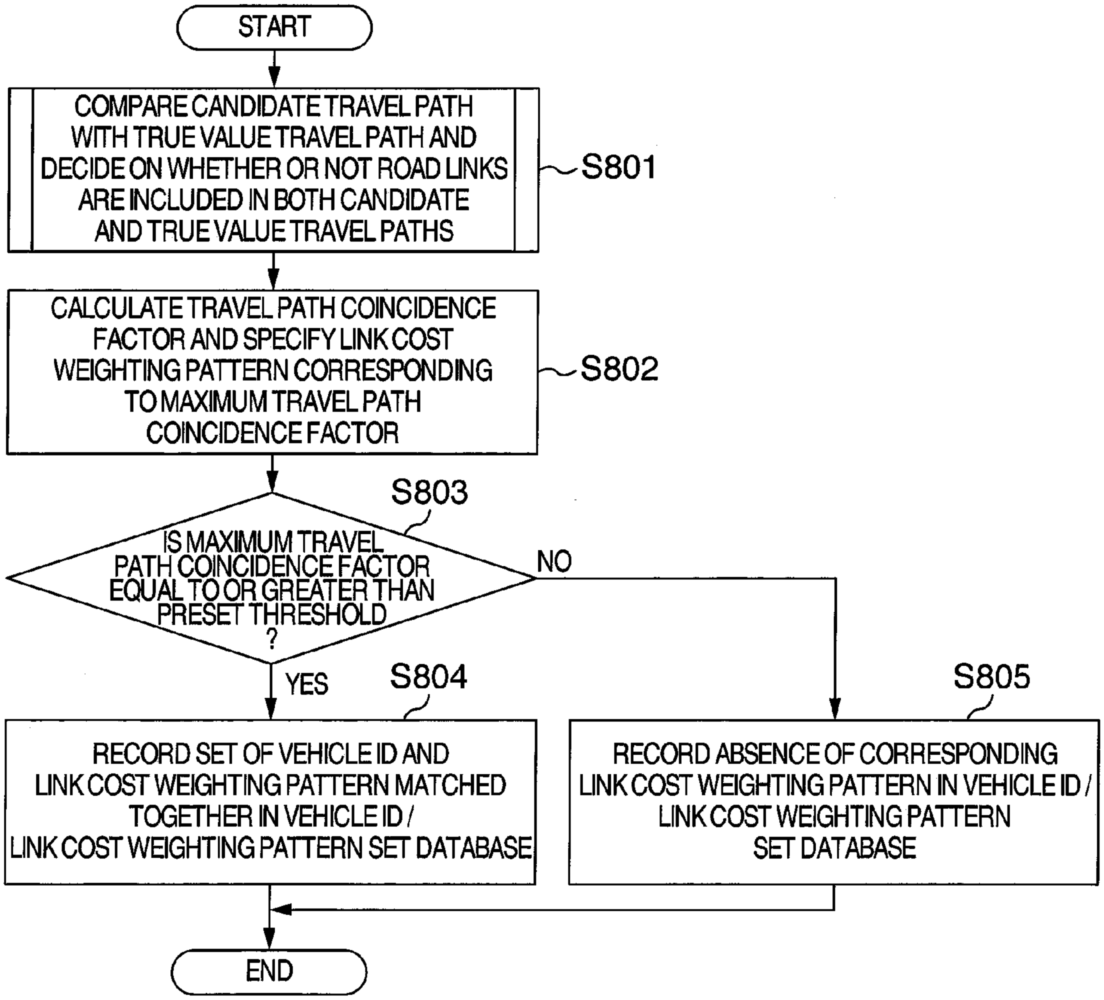
FIG. 8 is a flow chart for the procedure executed by the travel path comparison unit used in the vehicle ID/link cost weighting pattern matching unit shown in FIG. 6.

The two kinds of travel history data extracted as a result of the above procedures are used in the procedure for selecting or specifying the link cost weighting patterns used to determine the travel path of a vehicle. The travel history data extraction unit 603 extracts the travel history data from the travel history database 102 and delivers them to the map matching unit 604. The entire pattern travel path determination unit 605 determines travel paths on the basis of the output of the map matching unit 604 and all the link cost weighting patterns stored in the link cost weighting pattern database 111. In like manner, the travel history data extraction unit 603 extracts the detailed travel history data from the detailed travel history database 601 and delivers them to the detailed map matching unit 606. The detailed travel path determination unit 607 determines the actual travel path on the basis of the output of the detailed map matching unit 606. Then, the travel path comparison unit 608 compares the travel path determined depending on the detailed travel history data with the travel paths determined by using all the link cost weighting patterns. Further, the travel path comparison unit 608 specifies that link cost weighting pattern which can most accurately represent the travel path determined depending on the detailed travel history data. The very link cost weighting pattern is matched with suitable data on vehicle ID, and the matched data are recorded in the vehicle ID/link cost weighting pattern set database 112. FIG. 8 is a flow chart for the procedure executed by the travel path comparison unit 608.

First, the respective travel paths determined by the entire pattern travel path determination unit 605 on the basis of all the link cost weighting patterns stored in the link cost weighting pattern database 111 (hereafter referred to as candidate travel paths) are compared with the detailed travel path determined by the detailed travel path determination unit 607 (hereafter referred to as true value travel path). Then, decision is made on whether each of the road links (each road link lies between its fore node and hind node) constituting the candidate travel path and the corresponding one of the road links constituting the true value travel path are both included in both the candidate travel path and the true value travel path (Step 801). Now, the travel path coincidence factor is calculated which dictates how the candidate travel path is similar to the true value travel path, and that link cost weighting pattern which makes the travel path coincidence factor maximum is specified (Step 802). The travel path coincidence factor can be defined by, for example, the expression: $\Sigma(\alpha i \times Li)/\Sigma Li$, where Li represents the length of the road link i of the true value travel path under consideration, $\Sigma Li$ the total length of the true value travel path, and $\alpha i$ the value equal to 1 (unity) if the road link i is included in both the candidate travel path and the true value travel path, but 0 (zero) otherwise. Accordingly, the total of the lengths of the road links included in both the candidate travel path and the true value travel path is given by $\Sigma(\alpha i \times Li)$.

If the maximum value of the travel path coincidence factors thus calculated for candidate travel paths is equal or larger than a preset threshold (Step 803), the link cost weighting pattern corresponding to this maximum value of the travel path coincidence factors is regarded as the link cost weighting pattern for use in determining the travel path for the vehicle under consideration and stored in the vehicle ID/link cost weighting pattern set database 112 (Step 804). On the other hand, if the maximum value of the travel path coincidence factors is smaller than the preset threshold, it is considered that the link cost weighting pattern capable of accurately determining the travel path of the vehicle to be subjected to the intended procedure is not retained in the link cost weighting pattern database 111. Accordingly, the data indicating that there is no link cost weighting pattern for the very vehicle, is recorded in the vehicle ID/link cost weighting pattern database 112 (Step 805). Thereafter, the travel history data from this vehicle are not used in the procedure of generating real-time traffic data.

In the above described example, the travel path coincidence factor is defined concerning the total of the lengths of the road links included in the true value travel path. But the travel path coincidence factor may be similarly defined by using the lengths of the road links included in the candidate travel path. Further, the travel path coincidence factor may be defined by using the number, not the total of the lengths, of the road links included in the travel path such that $\Sigma\alpha i/n$, where n denotes the total number of the road links included in the travel path.

In the example described above, the link cost weighting patterns are matched only with the respective vehicle IDs, but the link cost weighting patterns may be matched with not only the vehicle IDs but also the combination of the attributes to the date and the locality data. In such a case, link cost weighting patterns can be selected depending on the vehicle IDs, the attributes to the date and the locality data so that only a part of the travel history data covering a particular date or locality alone can be or cannot be used in the procedure of generating traffic data.

Figure 9:
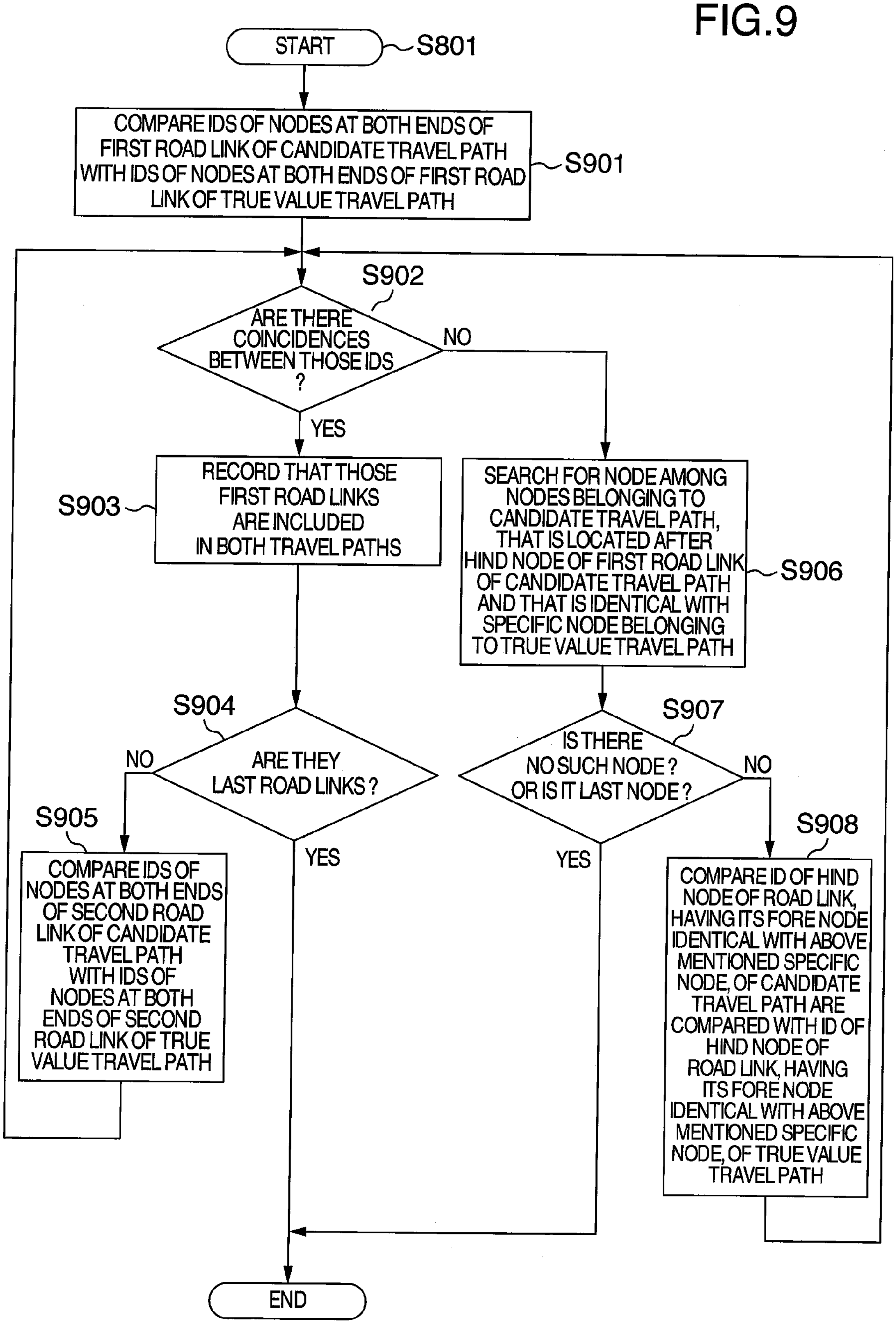
FIG. 9 is a flow char for the procedure executed by the travel path comparison unit to compare two travel paths.

FIG. 9 is a flow chart for the procedure of comparing the two kinds of travel paths performed in Step 801 in the flow chart shown in FIG. 8. First, the IDs of the fore node and hind node of the first road link of a candidate travel path are compared respectively with the IDs of the fore node and hind node of the first road link of the true value travel path (Step 901). Then, as a result of this comparison, decision is made on whether the IDs of the fore and hind nodes of the first road link of the candidate travel path coincide respectively with the IDs of the fore and hind nodes of the first road link of the true value travel path (Step 902). If there is a complete coincidence between the road link node IDs of the candidate travel path and those of the true value travel path, the compared road links are considered as included in both the travel paths and recorded as such (Step 903). Now, decision is made on whether or not the recorded road link is identical with the last road link of either of the candidate travel path and the true value travel path (Step 904). If the recorded road link is identical with the last road link of either travel path, this procedure is finished. But if it is not identified as the last road link, the fore and hind nodes of the second road link of the candidate travel path are compared respectively with the fore and hind nodes of the second road link of the true value travel path (Step 905), and Step 902 of making decision on the identity of the node IDs is reached again. On the other hand, if the comparison in Step 902 finds out that the fore node of the first road link of the candidate travel path differs from the fore node of the first road link of the true value travel path or that the hind node of the first road link of the candidate travel path differs from the hind node of the first road link of the true value travel path, then a search is made for a node among the nodes belonging to the candidate travel path, that is located after the hind node of the first road link of the candidate travel path and that is identical with a specific node belonging to the true value travel path ((Step 906). If, as a result of this search, a node that is identical with a specific node belonging to the true value travel path is not found, or if the node identical with the specific node is found but found out to be the final node of either of the candidate travel path and the true value travel path, then this procedure is finished (Step 907). If the node identical with the specific node is found and also found out to be none of the final nodes of the candidate travel path and the true value travel path, then the IDs of the fore and hind nodes of a road link, having its fore node identical with the above mentioned specific node, of the candidate travel path are compared with the IDs of the fore and hind nodes of a road link, having its fore node identical with the above mentioned specific node, of the true value travel path (Step 908). And the result of the comparison is then bifurcated in Step 902. By repeating the above described procedure, decision can be made on whether certain road links of a candidate travel path are included in the true value travel path.

As described above, the link cost weighting patterns reflecting drivers' preference in choosing vehicle travel paths, which are used in the procedure of determining the actual travel path of vehicle, can be previously obtained when traffic data are generated on the basis of the travel histories of floating cars. The drivers' preference in choosing the vehicle travel paths depends largely on their characters and likings and therefore is not considered to change frequently or drastically. Consequently, the matching of link cost weighting patterns with vehicle IDs may be renewed at relatively long intervals of, for example, a month, half a year or a year. When such setting of renewal intervals is employed, a drive recorder can be used to record the detailed travel history and process the matching of the vehicle IDs with the link cost weighting patterns.

According to the traffic information system as an embodiment of this invention described above, the link cost weighting patterns used to accurately determine the travel paths of vehicles can be generated and utilized for respective vehicles in the procedure of determining the vehicle travel paths among a series of procedures through which traffic data are generated from travel history data and distributed, so that vehicle travel paths can be accurately determined even on the basis of the real-time travel history recorded at relatively long temporal or spatial intervals. Thus, highly accurate traffic data can be generated and distributed by using travel history data of reduced size resulting from the data recording taking place at long temporal or spatial intervals.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A traffic information system comprising:

a travel history database for retaining the data on the travel history of vehicle measured at a constant temporal or spatial interval;

a map matching unit for specifying the road links which a vehicle traveled along, by using the travel history data retained in the travel history database;

a travel path determination unit for determining the travel path of the vehicle traveling along the specified road links;

a link cost weighting pattern database for storing one or more patterns for weighting the link costs of road links;

a vehicle ID/link cost weighting pattern matching unit for storing in a vehicle ID/link cost weighting pattern set database the data representing the matching of vehicle IDs with their associated link cost weighting patterns used to determine the travel paths of the vehicles; and a link cost weighting pattern selection unit for selecting the patterns for weighting the link costs stored in the link cost weighting pattern database on the basis of the vehicle IDs; wherein, the travel path determination unit determines the travel path of a vehicle depending on the travel history data of the vehicle by weighting the link costs of the road links by using the link cost weighting pattern selected by the link cost weighting pattern selection unit in accordance with the ID of the vehicle whose travel path is to be determined; and the vehicle ID/link cost weighting pattern matching unit comprises i) a detailed travel history database for retaining the data on the detailed travel history of vehicle measured at temporal or spatial intervals shorter than those at which the travel history of vehicle are measured;

ii) a travel history data extraction unit for extracting the travel history data and the detailed travel history data, recorded during the same time period, from the travel history database and the detailed travel history database, respectively;

iii) an entire pattern travel path determination unit for determining the travel path including the road links which the vehicle specified on the basis of the extracted travel history data traveled along, by using the pattern for weighting link costs stored in the link cost weighting pattern database;

iv) a detailed travel path determination unit for determining the travel path including the road links traveled along by the vehicle specified by using the detailed travel history data extracted from the detailed travel history database; and v) a travel path comparison unit for matching the ID of the vehicle from which the travel history data is obtained with the link cost weighting pattern used to determine the travel path that best simulates the travel path determined by the detailed travel path determination unit from among the travel paths determined by the entire pattern travel path determination unit, and for storing the matched information in the vehicle ID/link cost weighting pattern set database.

2. A traffic information system comprising:

a travel history database for retaining the data on the travel history of vehicle, measured at a constant temporal or spatial interval;

a map matching unit for specifying the road links which a vehicle traveled along, by using the travel history data accumulated in the travel history database;

a travel path determination unit for determining the travel path of the vehicle which travels along the specified road links;

a link cost weighting pattern database for storing patterns for weighting link costs of road links;

a vehicle ID/link cost weighting pattern matching unit for storing in the vehicle ID/link cost weighting pattern set database the data representing the matching of the vehicle IDs and the associated drive dates or areas with the patterns for weighting the link costs used to determine the travel paths of vehicles; and a link cost weighting pattern selection unit for selecting the patterns for weighting the link costs in accordance with the vehicle IDs and the associated drive dates or areas; wherein the travel path determination unit weights the link costs of the road links with the link cost weighting patterns selected by the link cost weighting pattern selection unit in accordance with the vehicle IDs and determines the travel paths on the basis of the travel history data of the vehicles; and the vehicle ID/link cost weighting pattern matching unit comprises;

i) a detailed travel history database for retaining the data on the detailed travel history of vehicle measured at temporal or spatial intervals shorter than those at which the travel history of vehicle are measured;

ii) a travel history data extraction unit for extracting the travel history data and the detailed travel history data, recorded during the same time period, from the travel history database and the detailed travel history database, respectively;

iii) an entire pattern travel path determination unit for determining the travel path including the road links which the vehicle specified on the basis of the extracted travel history data traveled along, by using the patterns for weighting link costs stored in the link cost weighting pattern database;

iv) a detailed travel path determination unit for determining the travel path including the road links which the vehicle specified by using the detailed travel history data extracted from detailed travel history database, traveled along; and v) a travel path comparison unit for matching the ID of the vehicle from which the travel history data is obtained and the associated drive date or area of the vehicle with the link cost weighting pattern used to determine the travel path that best simulates the travel path determined by the detailed travel path determination unit from among the travel paths determined by the entire pattern travel path determination unit, and for storing the matched information in the vehicle ID/link cost weighting pattern set database.

* * * * *